United States Patent
Kujime

(10) Patent No.: US 9,340,071 B2
(45) Date of Patent: May 17, 2016

(54) PNEUMATIC TIRE

(71) Applicant: Sumitomo Rubber Industries, Ltd., Kobe-shi, Hyogo (JP)

(72) Inventor: Tomoyuki Kujime, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 424 days.

(21) Appl. No.: 13/748,626

(22) Filed: Jan. 24, 2013

(65) Prior Publication Data

US 2013/0186532 A1    Jul. 25, 2013

(30) Foreign Application Priority Data

Jan. 25, 2012  (JP) ................................ 2012-013353

(51) Int. Cl.
   *B60C 11/03*    (2006.01)

(52) U.S. Cl.
   CPC ............ *B60C 11/0304* (2013.04); *B60C 11/033* (2013.04); *B60C 2011/0341* (2013.04); *B60C 2011/0348* (2013.04); *B60C 2011/0353* (2013.04); *B60C 2011/0367* (2013.04); *B60C 2011/0372* (2013.04); *B60C 2011/0381* (2013.04); *B60C 2011/0383* (2013.04); *B60C 2011/0388* (2013.04); *B60C 2011/0395* (2013.04)

(58) Field of Classification Search
   CPC .............. B60C 11/0304; B60C 11/033; B60C 2011/0381; B60C 2011/0367; B60C 2011/0369

See application file for complete search history.

(56) References Cited

U.S. PATENT DOCUMENTS

| | | | | |
|---|---|---|---|---|
| 5,435,364 A | * | 7/1995 | Hasegawa | B60C 11/0302 152/209.18 |
| D648,668 S | * | 11/2011 | Kujime | D12/519 |
| 2003/0226629 A1 | * | 12/2003 | Kimishima | B60C 11/0306 152/209.18 |
| 2005/0269004 A1 | | 12/2005 | Miyabe et al. | |
| 2010/0243117 A1 | * | 9/2010 | Daisho | 152/209.8 |

(Continued)

FOREIGN PATENT DOCUMENTS

| | | | |
|---|---|---|---|
| DE | 10311430 | * | 9/2004 |
| EP | 1695844 | * | 8/2006 |
| EP | 2151333 | * | 2/2010 |

(Continued)

OTHER PUBLICATIONS

English machine translation of DE10311430, dated Sep. 2004.*

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A pneumatic tire with a designated installing direction to a vehicle, includes a tread portion with an inboard and an outboard tread edges, the tread portion provided with a pair of inboard and outboard center main grooves and a pair of inboard and outboard shoulder main grooves to form a center portion, a pair of middle portions, and a pair of shoulder portions, each of the inboard center main groove, the outboard center main groove and the inboard shoulder main groove having a groove width of from 10 to 20 mm, the outboard shoulder main groove having a groove width of from 2 to 5 mm, the outboard shoulder portion provided with outboard shoulder lateral grooves each extending from the outboard tread edge without reaching the outboard shoulder main groove, and the outboard middle portion provided with outboard middle lateral grooves.

14 Claims, 6 Drawing Sheets

(56) References Cited

U.S. PATENT DOCUMENTS

2011/0297284 A1* 12/2011 Montesello et al. ....... 152/209.8
2012/0085471 A1* 4/2012 Horiguchi .................. 152/209.9

FOREIGN PATENT DOCUMENTS

| JP | 11-001105 | * | 1/1999 |
| JP | 2003-285610 A | | 10/2003 |

* cited by examiner

PNEUMATIC TIRE

BACKGROUND OF THE INVENTION

1. Field of the Invention

The present invention relates to a pneumatic tire improved in steering stability and noise performance while maintaining the drainage performance.

2. Description of the Related Art

A pneumatic tire having a tread portion provided with circumferentially extending main grooves is proposed. Such main grooves may drain the water between the tread portion and the road. Also, the larger the groove width of the main groove, the better the drainage performance is.

However, when the groove width of the main groove is too large, the noise performance is liable to deteriorate due to the air tube resonance therein. Moreover, when the tread portion has a small land ratio, the steering stability of the tire is liable to decrease due to the small rigidity of the tread portion.

JP-2003-285610-A1 discloses a pneumatic tire having a tread portion provided with a plurality of main grooves to form a rib-tread pattern. The tire above has a limited total groove width in a certain range for main grooves, and is neither provided any sipes nor slots which extend from the main grooves to increase the rigidity of ribs. The tire may improve the steering stability and noise performance. However, such a tire has an unsatisfactory drainage performance.

SUMMARY OF THE INVENTION

The present invention has been worked out in light of the circumstances described above, and has a main object of providing a pneumatic tire in which the steering stability and noise performance can be improved while maintaining the drainage performance.

In accordance with the present invention, there is provided a pneumatic tire having a designated installing direction to a vehicle, comprising a tread portion having an inboard tread edge and an outboard tread edge, the tread portion being provided with: a pair of circumferentially extending inboard and outboard center main grooves disposed both sides of a tire equator to define a center portion therebetween; a pair of circumferentially extending inboard and outboard shoulder main grooves disposed axially outside of the inboard and outboard center main grooves; a pair of middle portions which include an inboard middle portion defined between the inboard center main groove and the inboard shoulder main groove, and an outboard middle portion defined between the outboard center main groove and the outboard shoulder main groove; and a pair of shoulder portions which include an inboard shoulder portion defined the axially outside of the inboard shoulder main groove, and an outboard shoulder portion defined the axially outside of the outboard shoulder main groove, wherein each of the inboard center main groove, the outboard center main groove and the inboard shoulder main groove has a groove width in a range of from 10 to 20 mm, the outboard shoulder main groove has a groove width in a range of from 2 to 5 mm, the outboard shoulder portion is provided with a plurality of outboard shoulder lateral grooves each of which extends at least from the outboard tread edge to the axially inside of the tire and terminates without reaching the outboard shoulder main groove, the outboard middle portion is provided with a plurality of outboard middle lateral grooves each of which extends from the outboard shoulder main groove beyond a center in width direction of the outboard middle portion without reaching the outboard center main groove, the inboard middle portion is provided with a plurality of inboard middle sipes each of which extends from the inboard shoulder main groove beyond a center in width direction of the inboard middle portion without reaching the inboard center main groove, and the inboard shoulder portion is provided with a plurality of inboard shoulder lateral grooves each of which connects between the inboard tread edge and the inboard shoulder main groove.

In this application including specification and claims, various dimensions, positions and the like of the tire refer to those under a normally inflated unloaded condition of the tire unless otherwise noted. The normally inflated unloaded condition is such that the tire is mounted on a standard wheel rim and is inflated to a standard pressure but loaded with no tire load.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

DETAILED DESCRIPTION

An embodiment of the present invention will be explained below with reference to the accompanying drawings.

Figure 1:
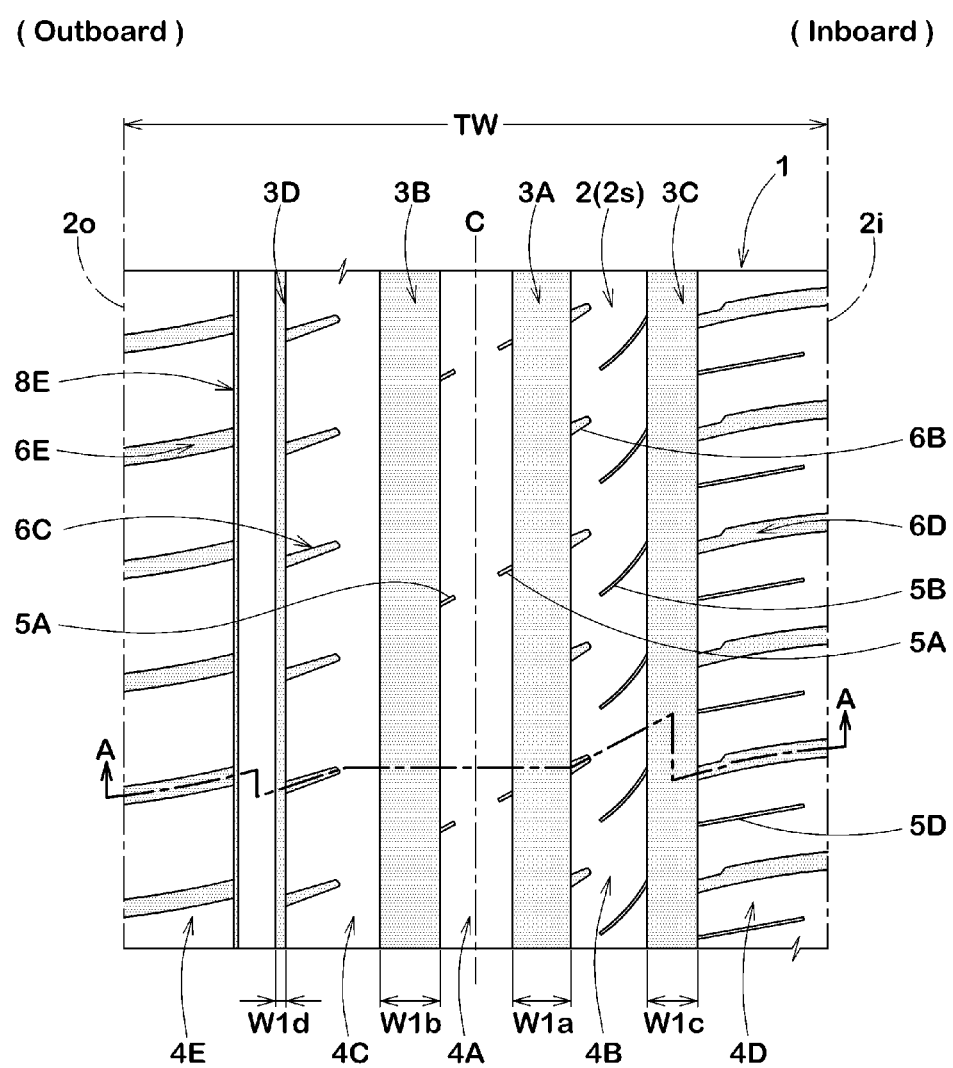
FIG. 1 is a development view of a tread portion of a pneumatic tire showing an embodiment of the present invention.

As shown in FIG. 1, a pneumatic tire (hereinafter it may simply be referred as "the tire") 1 in accordance with the present invention has a designated installing direction to a vehicle. The installing direction may be indicated on the sidewall portion of the tire 1 using characters such as "inside" and "outside", for example.

The tire 1 includes a tread portion 2 with a left-right asymmetry tread pattern including an inboard tread edge 2*i* and an outboard tread edge 2*o* defining a tread width TW therebetween. The tread edges 2*o* and 2*i* are defined as edges of the tread portion 2 if those are clearly identified in appearance. However if it is difficult, the tread edges 2*o* and 2*i* are defined as the axial outermost edges of the ground contacting patch which occurs under the normally inflated loaded condition when the camber angle of the tire is zero.

The normally inflated loaded condition is such that the tire is mounted on the standard wheel rim and inflated to the standard pressure and loaded with a standard tire load. Moreover, the standard tire load is the "maximum load capacity" in JATMA, the "Load Capacity" in ETRTO, and the maximum value given in the above-mentioned table in TRA or the like.

The inboard tread edge 2i refers to one of the two tread edges which is intended to be positioned towards the center of the vehicle body. The outboard tread edge 2o refers to the other tread edge which is intended to be positioned away from the center of the vehicle body. According thereto, in this application, the terms "outboard" and "inboard" are used toward the outboard tread edge 2o and inboard tread edge 2i, respectively, to refer relative positions in the tire axial direction.

The terms "axially inner", "axially inward" and the like are used toward the tire equator C, and the terms "axially outer", "axially outward" and the like are used toward the tread edge in order to refer relative positions in the tire axial direction.

The tread portion 2 of the pneumatic tire 1 is provided with a pair of circumferentially extending center main grooves 3A, 3B disposed both sides of the tire equator C, and a pair of circumferentially extending shoulder main grooves 3C, 3D disposed the axially outside of center main grooves 3.

The center main grooves include: an inboard center main groove 3A which is disposed in the side of the inboard tread edge 2i than the tire equator C, and an outboard center main groove 3B which is disposed in the side of the outboard tread edge 2o than the tire equator C.

Also, the shoulder main grooves include: an inboard shoulder main groove 3C which is disposed in the side of the inboard tread edge 2i than the inboard center main groove 3A, and an outboard shoulder main groove 3D which is disposed in the side of the outboard tread edge 2o than the outboard center main groove 3B.

Hence, the tread portion 2 includes: a center portion 4A between the outboard and inboard center main grooves 3A and 3B; an inboard middle portion 4B defined between the inboard center main groove 3A and the inboard shoulder main groove 3C; an outboard middle portion 4C defined between the outboard center main groove 3B and the outboard shoulder main groove 3D; an inboard shoulder portion 4D defined between the inboard shoulder main groove 3C and the inboard tread edge 2i; and an outboard shoulder portion 4E defined between the outboard shoulder main groove 3D and the outboard tread edge 2o.

Preferably, in order to improve the noise performance while maintaining the drainage performance, the tread portion 2 has a land ratio Sb/Sa in a range of from 69 to 73%, wherein: "Sb" is the net ground-contacting area of the ground-contacting region of the tread portion 2; and "Sa" is the gross area of the ground-contacting region of the tread portion 2 including the grooved area.

If the land ratio Sb/Sa is less than 69%, the air tube resonance is liable to be produced due to large grooved area. On the other hand, if the land ratio Sb/Sa is more than 73%, the drainage performance is liable to deteriorate due to small grooved area.

Figure 2:
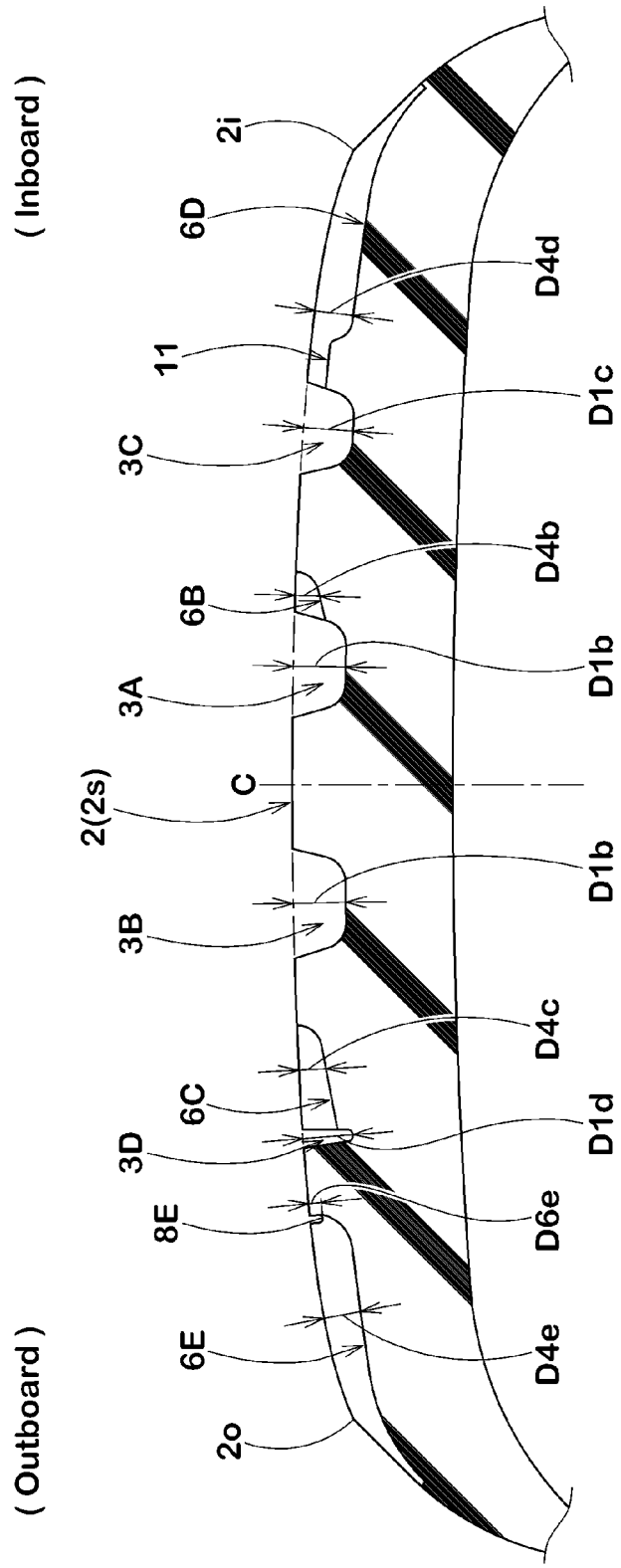
FIG. 2 is a cross sectional view taken along the line A-A of FIG. 1.

Each of the inboard center main groove 3A, the outboard center main groove 3B, the inboard shoulder main groove 3C and the outboard shoulder main groove 3D is preferably formed as a straight groove extending along the circumferential direction of the tire to drain the water between the tread portion 2 and the road outside toward the tire circumferential direction when running. Referring to FIG. 2, groove depths D1a, D1b, D1c and D1d of main grooves 3A, 3B 3C and 3D are preferably in a range of from 6 to 10 mm.

Referring to FIG. 1, each of the inboard center main groove 3A, the outboard center main groove 3B and the inboard shoulder main groove 3C has a groove width W1a, W1b and W1c in a range of from 10 to 20 mm, respectively. On the other hand, the outboard shoulder main groove 3D has a groove width W1d in a range of from 2 to 5 mm.

Accordingly, the inboard center main groove 3A, the outboard center main groove 3B and the inboard shoulder main groove 3C having large groove widths W1a, W1b and W1c are useful to effectively enhance the drainage performance.

Since the influence of the outboard shoulder main groove 3D on the air tube resonance is great, such an outboard shoulder main groove 3D having a comparatively small groove width W1d is useful for effectively preventing the air tube resonance therein, and thereby the noise performance is improved. Basically, a large side force is applied on the outboard of tread portion 2 when cornering. However, since such an outboard shoulder main groove 3D having a comparatively small groove width W1d maintains the rigidity of the outboard tread portion 2, the steering stability is also improved.

In order to further improve the steering stability and noise performance while maintaining the drainage performance, each groove width W1a, W1b and W1c is preferably in a range of from 12 to 18 mm.

In order to further prevent the air tube resonance while maintaining the drainage performance, the groove width W1d is preferably in a range of from 3 to 4 mm.

Preferably, the outboard center main groove 3B has the largest groove width W1b in the main grooves 3A to 3C. Although drainage performance on the outboard tread portion comparatively tends to be lower, such an outboard center main groove 3B having the largest groove width W1b may compensate for improving the drainage performance on the outboard of the tread portion 2. Preferably, a groove width ratio W1b/W1a of the groove width W1b of the outboard center main groove 3B to the groove width W1a of the inboard center main groove 3A is in a range of from 102 to 106%.

Figure 3:
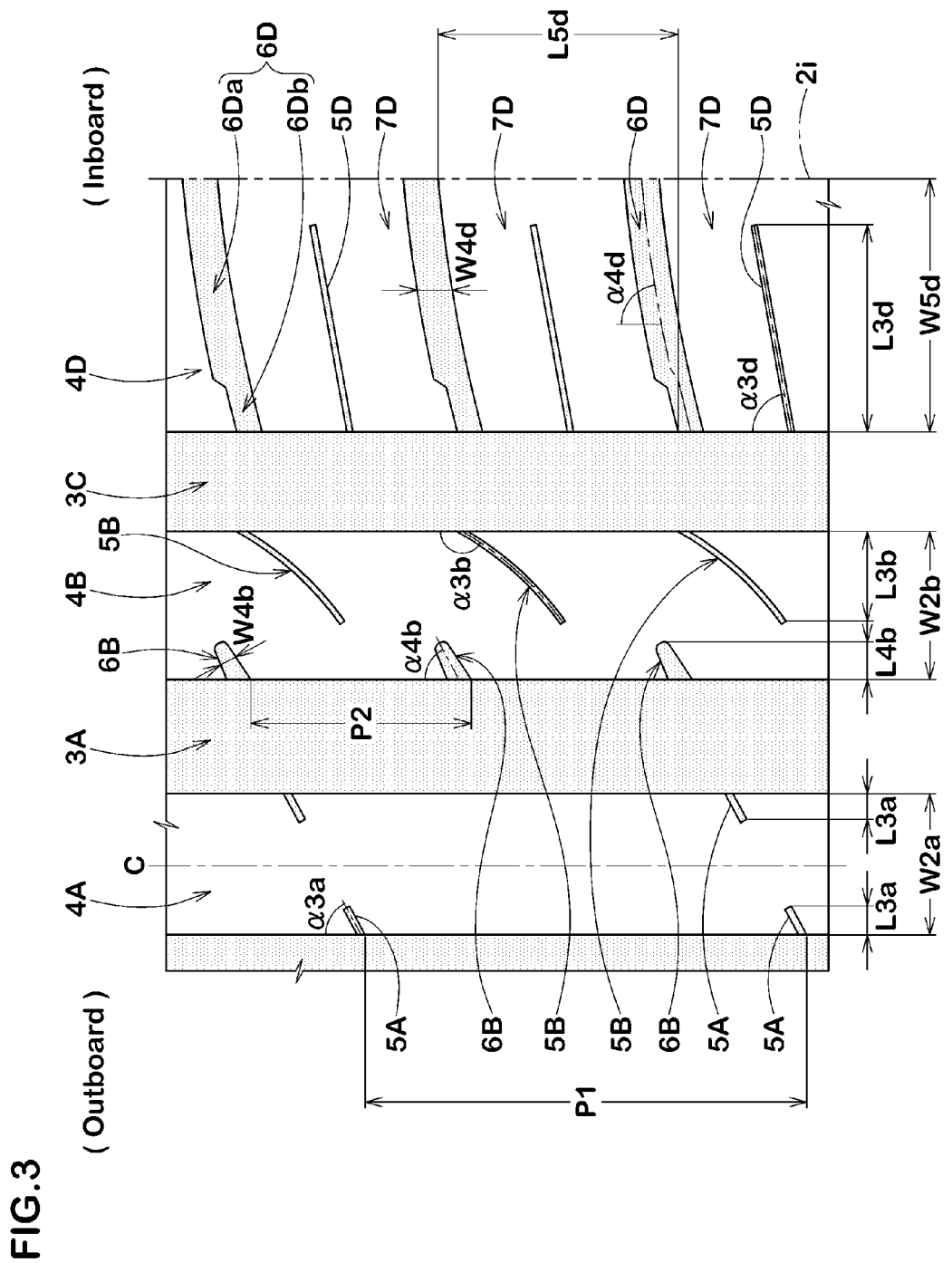
FIG. 3 is a partial enlarged view of an inboard of the tread portion in FIG. 1.

Referring to FIG. 3, the center portion 4A is formed as a rib which straightly and continuously extends in the tire circumferential direction. Namely, the center portion 4A is not divided perfectly in the tire circumferential direction by any grooves.

Such a center portion 4A has a high rigidity in the tire circumferential direction, and thereby the stability in straight running is improved. Also, since the center portion 4A has no lateral grooves which connect between the inboard and outboard center main grooves 3A and 3B, it does not produce the air tube resonance. Preferably, the maximum land width W2a of the center portion 4A is in a range of from 8 to 13% of the tread width TW (shown in FIG. 1).

The center portion 4A is provided with a plurality of center sipes 5A at least one of which extends from the inboard center main groove 3A and at least one of which extends from the outboard center main groove 3B, respectively. Each center sipe 5A has an axially inner end without reaching the tire equator C to improve the grounding-property of the center portion 4A while increasing the sipe edges. Also, the straight running stability and initial response of cornering may be improved by such a center portion 4A. Preferably, the center sipe 5A has a length L3a in the tire axial direction in a range of from 15 to 25% of the maximum width W2a of the center portion 4A, and has the depth of from 3 to 6 mm.

Preferably, the center sipe 5A is inclined at angle α3a of from 50 to 70 degrees with respect to the tire circumferential direction to effectively improve the grounding-property of the center portion 4A.

Preferably, a pitch P1 between adjacent center sipes 5A in the tire circumferential direction is larger than a pitch P2 between adjacent inboard middle lateral grooves 6B (it will describe later). Such an arrangement of center sipes 5A is useful to enhance the rigidity of the center portion 4A, and thereby the transient response in lane-change may be stable.

In order to further improve the effects above, the pitch P1 of center sipes 5A is preferably in a range of from 150 to 250%, and more preferably in a range of from 170 to 230% the pitch P2 of inboard middle lateral grooves 6B.

Similarly, the inboard middle portion 4B is formed as a straight rib to improve the steering stability and the noise performance. Preferably, the maximum width W2b of the inboard middle portion 4B is in a range of from 8 to 13% the tread width TW (shown in FIG. 1).

The inboard middle portion 4B is provided with a plurality of inboard middle sipes 5B each of which extends from the inboard shoulder main groove 3C to the axially inside of the tire, and a plurality of inboard middle lateral grooves 6B each of which extends from the inboard center main groove 3A to the axially outside of the tire. The inboard middle sipes 5B and the inboard middle lateral grooves 6B are alternately arranged in the tire circumferential direction.

Each inboard middle sipes 5B has an axially inner end which goes beyond a center in width direction of the inboard middle portion 4B and terminates within the inboard middle portion 4B without reaching the inboard center main groove 3A.

Accordingly, the grounding-property of the center portion 4A is improved by such an inboard middle sipe 5B while increasing the sipe edges. Preferably, the axial length L3b of the inboard middle sipe 5B is in a range of from 60 to 70% the maximum width W2b of the inboard middle portion 4B, and the sipe depth thereof is preferably set the same range with the center sipe 5A.

The inboard middle sipe 5B has an angle (an obtuse angle) $\alpha 3b$ with respect to the circumferential direction of the tire which is gradually decreasing toward the tire equator C. Such an inboard middle sipe 5B improves grounding-property of the inboard middle portion 4B, and increases the edge thereof. Since the inboard middle sipe 5B may cause the pressure fluctuation in the inboard shoulder main groove 3C, the air tube resonance in the inboard shoulder main groove 3C is also prevented. Preferably, the angle $\alpha 3b$ is in a range of from 120 to 155 degrees.

In order to improve the effects above, the angle $\alpha 3b$ is still further preferably in a range of from 130 to 150 degrees.

The inboard middle lateral groove 6B extends from the inboard center main 3A groove to the axially outside of the tire. The inboard middle lateral groove 6B has an axially outer end which terminates within the inboard middle portion 4B without going beyond the center in width direction of the inboard middle portion 4B. Such an inboard middle lateral groove 6B may improve the steering stability and the drainage performance. Preferably, the axial length L4b of the inboard middle lateral groove 6B is in a range of from 15 to 25% the maximum width W2b of the inboard middle portion 4B, the groove width W4b thereof is preferably in a range of from 1 to 3% the tread width TW (shown in FIG. 1), and the groove depth D4b (shown in FIG. 2) thereof is preferably in a range of from 3 to 6 mm.

Preferably, the inboard middle lateral groove 6B has an angle $\alpha 4b$ of from 50 to 70 degrees with respect to the circumferential direction of the tire to improve the drainage performance.

Figure 4:
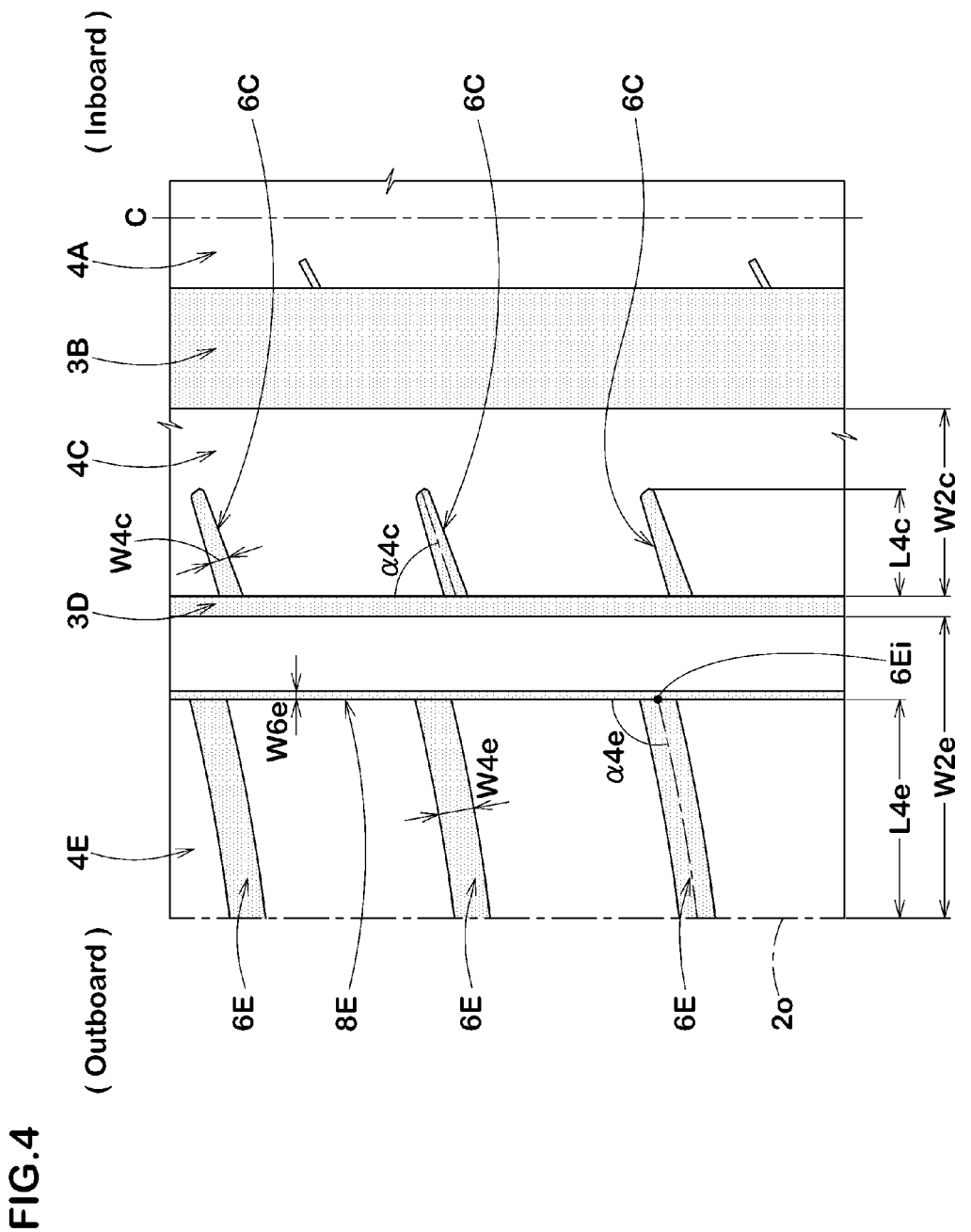
FIG. 4 is a partial enlarged view of an outboard of the tread portion in FIG. 1.

Referring to FIG. 4, the outboard middle portion 4C is also formed as a straight rib to improve the steering stability and noise performance. Preferably, the maximum width W2c of the outboard middle portion 4C is in a range of from 10 to 15% the tread width TW (shown in FIG. 1).

The outboard middle portion 4C is provided with a plurality of outboard middle lateral groove 6C each of which extends from the outboard shoulder main groove 3D to the axially inside and terminates within the outboard middle portion 4C. Each outboard middle lateral groove 6C has an axially inner end which goes beyond a center in width direction of the outboard middle portion 4C.

Since the outboard middle lateral groove 6C has a large groove length in the tire axial direction, the drainage performance on the outboard tread portion is improved. Preferably, the axial length L4c of the outboard middle lateral groove 6C is in a range of from 55 to 65% the maximum width W2c of the outboard middle portion 4C, the groove width W4c thereof is preferably in a range of from 1 to 3% the tread width TW (shown in FIG. 1), the groove depth D4c (shown in FIG. 2) thereof is in a range of from 2 to 7 mm.

The outboard middle lateral groove 6C has an angle $\alpha 4c$ of from 50 to 70 degrees with respect to the circumferential direction of the tire to improve the drainage performance.

Referring to FIG. 3, the inboard shoulder portion 4D is provided with a plurality of inboard shoulder lateral grooves 6D each of which extends from the inboard shoulder main groove 3C to the inboard tread edge 2i to form a plurality of inboard shoulder blocks 7D.

The inboard shoulder lateral groove 6D has an angle $\alpha 4d$ gradually decreasing toward the inboard shoulder main groove 3C to smoothly drain the water between the inboard shoulder portion 4D and the road, and thereby the drainage performance is further improved. Preferably, the inboard shoulder lateral groove 6D has an angle $\alpha 4d$ of from 50 to 90 degrees, the groove width W4d thereof is preferably in a range of from 1.5 to 3% the tread width TW (shown in FIG. 1), and the groove depth D4d thereof (shown in FIG. 2) is in a range of from 2 to 7 mm.

The inboard shoulder lateral groove 6D, for example, includes: a wide portion 6Da extending from the inboard tread edge 2i toward the inboard shoulder main groove 3C; and a narrow portion 6Db having a groove width smaller than that of the wide portion 6Da and connecting between the wide portion 6Da and the inboard shoulder main groove 3C. The narrow portion 6Db is provided with a tie-bar 11 (shown in FIG. 2) which has a protruded groove bottom so as to have a small groove depth to enhance the rigidity of inboard shoulder blocks, and thereby the steering stability may be improved.

The inboard shoulder block 7D has a substantially rectangular shape having the length L5d in the tire circumferential direction and the width W5d in the tire axial direction which is about equal to the length L5d. Since the inboard shoulder block 7D has a high circumferentially rigidity, the steering stability is effectively improved. Preferably, the length L5d and the width W5d of the inboard shoulder block 7D is in a range of from 15 to 20% the tread width TW (shown in FIG. 1).

Each inboard shoulder block 7D is provided with a inboard shoulder sipe 5D extending from the inboard shoulder main groove 3C to the axially outside of the tire without reaching the inboard tread edge 2i. The inboard shoulder sipe 5D has an angle $\alpha 3d$ of from 70 to 80 degrees with respect to the tire circumferential direction.

The inboard shoulder sipe 5D softens the rigidity of the inboard shoulder block 7D so that the grounding-property is improved. Moreover, the inboard shoulder sipe 5D increases edges in the inboard shoulder block 7D so that the cornering performance is improved. Preferably, the axial length L3d of the inboard shoulder sipe 5D is in a range of from 75 to 85% the width W5d of the inboard shoulder block 7D, and the sipe depth thereof (not shown) is preferably in the same range with the center sipe 5A.

Referring to FIG. 4, the outboard shoulder portion 4E is formed as a straight rib to improve the steering stability and the noise performance. Preferably, the maximum width W2e of the outboard shoulder portion 4E is in a range of from 18 to 24% the tread width TW (shown in FIG. 1).

The outboard shoulder portion 4E is provided with a plurality of outboard shoulder lateral grooves 6E and an outboard shoulder sub groove 8E. Each outboard shoulder lateral grooves 6E extends from the outboard shoulder tread edge 2o to the axially inside of the tire and has an axially inner end 6Ei without reaching the outboard shoulder groove 3D. The outboard shoulder sub groove 8E extends in the tire circumferential direction so as to connect each inner end 6Ei of the outboard shoulder lateral grooves 6E.

The outboard shoulder groove 6E has an angle α4e with respect to the tire circumferential direction gradually decreasing toward the axially inside of the tire so that the drainage performance and the steering stability are improved.

In order to further improve the effects above, the axial length L4e of the outboard shoulder lateral groove 6E is preferably in a range of from 65 to 75% the maximum width W2e of the outboard shoulder portion 4E, the groove width W4e of thereof is in a range of from 1.5 to 3% the tread width TW (shown in FIG. 1), the groove depth D4e thereof is in a range of from 2 to 7 mm, and the angle α4e is in a range of from 70 to 90 degrees.

The outboard shoulder sub groove 8E straightly extends along the tire circumferential direction to improve the drainage performance on the outboard shoulder portion 4E.

Preferably, the outboard shoulder sub groove 8E has the groove width W6e of from 0.3 to 1% the tread width TW (shown in FIG. 1), and the groove depth D6e (shown in FIG. 2) thereof is preferably in a range of from 1 to 3 mm to improve the noise performance and steering stability.

The present invention is more specifically described and explained by means of the following Examples and References. It is to be understood that the present invention is not limited to these Examples.

Comparison Test

Figure 5:
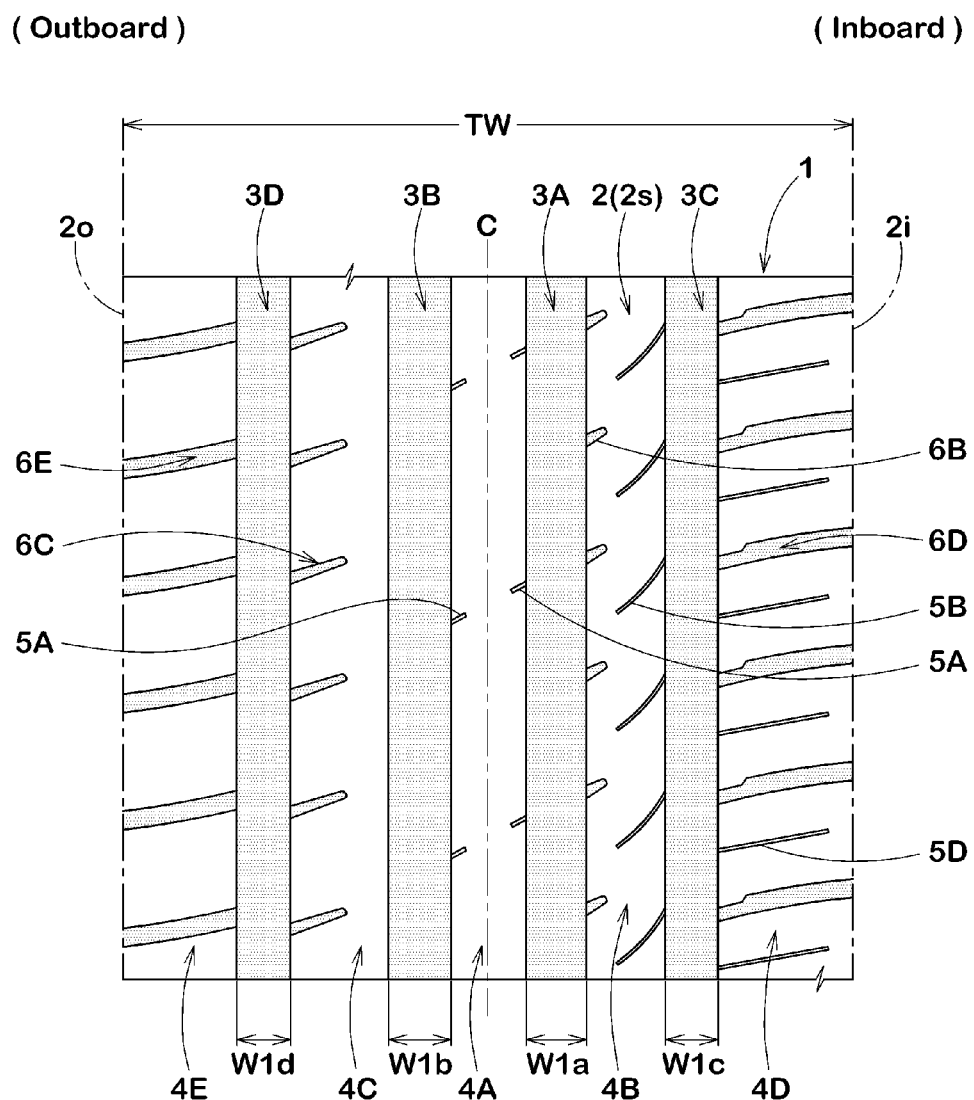
FIG. 5 is a development view of a tread portion of a pneumatic tire showing a Reference 1.
Figure 6:
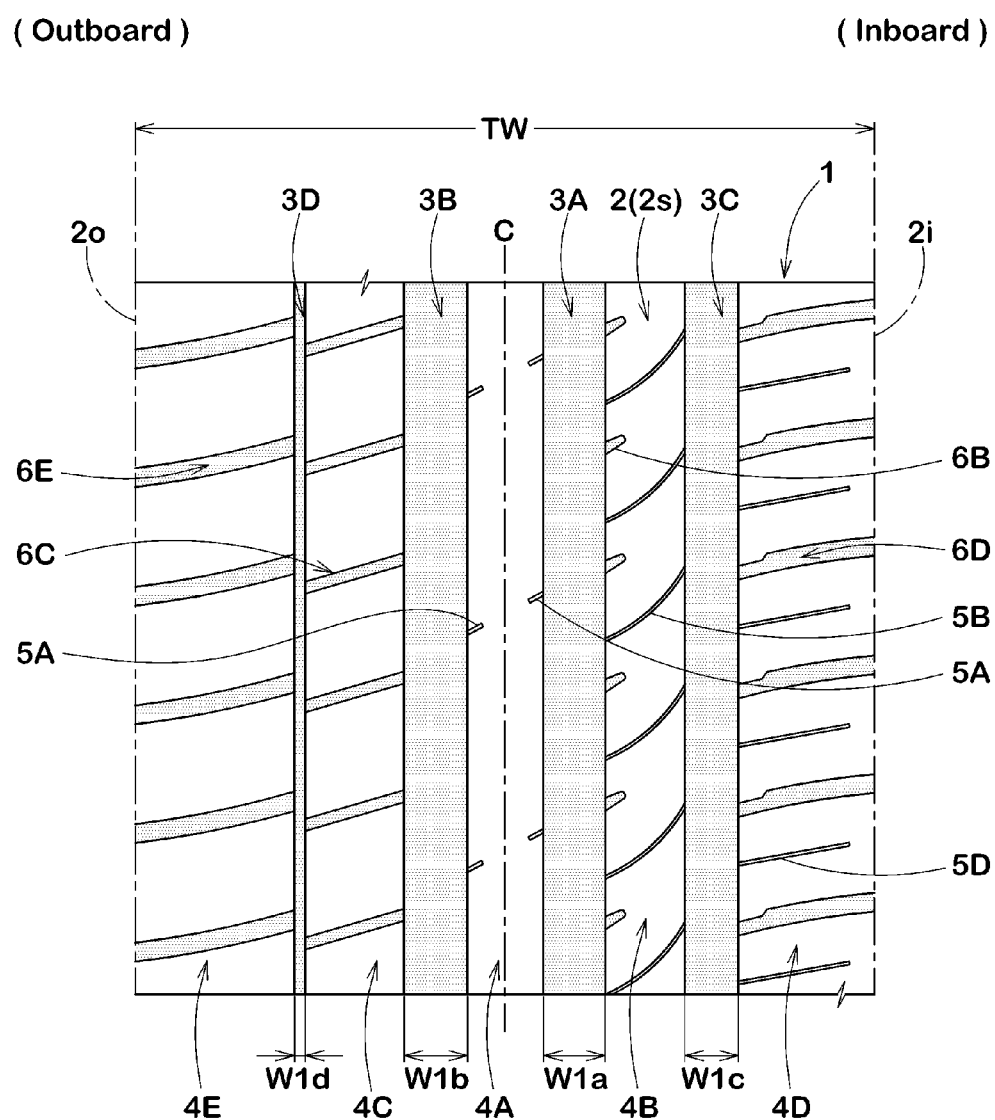
FIG. 6 is a development view of a tread portion of a pneumatic tire showing a Reference 2.

Pneumatic tires with basic tread patterns of FIG. 1 except for details shown in Table 1 were made and tested. As shown in FIG. 5, the Reference 1 which has an outboard shoulder main groove 3D having the same groove width with the inboard shoulder main groove 3A was also tested. As shown in FIG. 6, the Reference 2 which has outboard shoulder lateral grooves, outboard middle lateral grooves, inboard middle sipes and inboard shoulder lateral grooves each of which is connected to main grooves was also tested. Major common specifics and test method are as follows.

Tire size: 225/45 R17
Rim size: 17×7.0JJ
Tread width TW: 198 mm
Groove depth of main groove D1a, D1b, D1c, D1d: 8.2 mm
Maximum width W2a of center portion: 20.47 mm
Ratio W2a/TW: 10.3%
maximum width W2b of inboard middle portion: 21.46 mm
Ratio W2b/TW: 10.8%
Maximum width W2c of outboard middle portion: 26.65 mm
Ratio W2c/TW: 13.5%
Maximum width W2e of outboard shoulder portion: 42.33 mm
Ratio W2e/TW: 21.4%
Inboard Shoulder Block
width W5d: 36.15 mm
Ratio W5d/TW: 18.3%
Circumferential length L5d: 54.8 mm
Ratio L5d/TW: 27.7%
Center Sipe
Length L3a: 3.4 mm
Ratio L3a/W2a: 1.7%
Depth: 4.4 mm
Angle α3a: 60 degrees
Inboard Middle Sipe
Length L3b: 12.5 mm
Ratio L3b/W2b: 6.3%
Depth: 4.6 mm
Inboard Middle Lateral Groove
Length L4b: 5.5 mm
Ratio L4b/W2b: 2.8%
Groove width W4b: 2.4 to 3.0 mm
Ratio W4b/TW: 1.2 to 1.5%
Groove depth D4b: 3 to 5.4 mm
Angle α4b: 60 degrees
Outboard Middle Lateral Groove
Length L4c: 15.2 mm
Ratio L4c/W2c: 7.7%
Groove width W4b: 2.4 to 3.0 mm
Ratio W4b/TW: 1.2 to 1.5%
Groove depth D4c: 3 to 6.6 mm
Angle α4c: 60 degrees
Inboard Shoulder Lateral Groove
Groove width W4d: 2.4 to 3.3 mm
Ratio W4b/TW: 1.2 to 1.6%
Groove depth D4d: 3.0 to 6.0 mm
Angle α4d: 80 to 85 degrees
Inboard Shoulder Sipe
Length L3d: 28.9 mm
Ratio L3d/W5b: 14.6%
Depth: 2.0 to 5.9 mm
Angle α3d: 80 degrees
Outboard Shoulder Lateral Groove
Length L4e: 30.55 mm
Ratio L4e/W2e: 15.4%
Groove width W4e: 3.3 mm
Ratio W4e/TW: 1.6%
Groove depth D4e: 6.0 mm
Angle α4e: 80 to 85 degrees
Outboard Shoulder Sub Groove
Groove width W6e: 3.0 mm
Ratio W6e/TW: 1.5%
Groove depth D6e: 2.0 mm Noise Performance Test:

According to JASO C-606, a Japanese FF passenger car with a displacement of 2,400 cc provided on all the wheels with test tires was coasted on a smooth asphalt road, and the pass-by noise was measured with a microphone fixed at a position 7.5 meter sideways from the center line of the running course. The tires were mounted on a rim and inflated to an inner pressure of 220 kPa. The performance was evaluated by the reciprocal number of the noise. Test results are indicated by an index of based on Reference 1 being 100. The larger the value, the better the noise level is.

Drainage Performance Test:

The test car above was driven on a wet asphalt road with 5mm depth of water and suddenly braked at a speed of 60 km/hr so that the ABS worked. The reciprocal number of the braking distance of each tires were measured. The results are shown with an index of 100 representing a value in Reference 1. The larger the value, the better the performance is.

Steering Stability Test:

A professional test driver drove the test car above on a test course having a dry asphalt road, and evaluated steering stability such as the steering response during cornering, stiffness and cornering grip according to his feeling. The results are shown with a score of 100 representing a value in Reference 1. The larger the value, the better the performance is.

Test results are shown in Table 1

TABLE 1

|  | Ref. 1 | Ref. 2 | Ex. 1 | Ref. 3 | Ex. 2 | Ex. 3 | Ref. 4 | Ref. 5 | Ex. 4 |
|---|---|---|---|---|---|---|---|---|---|
| Tread pattern | FIG. 5 | FIG. 6 | FIG. 1 | FIG. 1 | FIG. 1 | FIG. 1 | FIG. 1 | FIG. 1 | FIG. 1 |
| Groove width w1a of inboard center main groove (mm) | 16.5 | 16.5 | 16.5 | 8 | 10 | 20 | 22 | 16.5 | 16.5 |
| Groove width w1b of outboard center main groove (mm) | 17.1 | 17.1 | 17.1 | 8 | 10 | 20 | 22 | 17.1 | 17.1 |
| Groove width w1c of inboard shoulder main groove (mm) | 14.4 | 14.4 | 14.4 | 8 | 10 | 20 | 22 | 14.4 | 14.4 |
| Groove width w1d of outboard shoulder main groove (mm) | 14.4 | 2.9 | 2.9 | 2.9 | 2.9 | 2.9 | 2.9 | 1 | 2 |
| Area Sb ($cm^2$) | 120 | 129 | 129 | 142 | 133 | 126 | 122 | 129 | 129 |
| Area Sa ($cm^2$) | 182 | 182 | 182 | 182 | 182 | 182 | 182 | 182 | 182 |
| Land ratio Sb/Sa (%) | 66 | 71 | 71 | 78 | 73 | 69 | 67 | 71 | 71 |
| Center sipe | Presence | Presence | Presence | Presence | Presence | Presence | Presence | Presence | Presence |
| Pitch length P1 of center sipes (mm) | 60 | 60 | 60 | 60 | 60 | 60 | 60 | 60 | 60 |
| Pitch length P2 of inboard middle lateral grooves (mm) | 30 | 30 | 30 | 30 | 30 | 30 | 30 | 30 | 30 |
| Ratio P1/P2 (%) | 200 | 200 | 200 | 200 | 200 | 200 | 200 | 200 | 200 |
| Angle α3b of inboard middle sipe (degree) | 130-145 | 130-145 | 130-145 | 130-145 | 130-145 | 130-145 | 130-145 | 130-145 | 130-145 |
| Noise performance (Index) | 100 | 95 | 110 | 120 | 115 | 95 | 85 | 110 | 110 |
| Drainage performance (Index) | 100 | 110 | 98 | 70 | 90 | 120 | 120 | 85 | 96 |
| Steering stability (Index) | 100 | 95 | 115 | 120 | 118 | 90 | 85 | 115 | 115 |

|  | Ex. 5 | Ref. 6 | Ex. 6 | Ex. 7 | Ex. 8 | Ex. 9 | Ex. 10 | Ex. 11 | Ex. 12 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| Groove width w1a of inboard center main groove (mm) | 16.5 | 16.5 | 16.5 | 16.5 | 16.5 | 16.5 | 16.5 | 16.5 | 16.5 |
| Groove width w1b of outboard center main groove (mm) | 17.1 | 17.1 | 17.1 | 17.1 | 17.1 | 17.1 | 17.1 | 17.1 | 17.1 |
| Groove width w1c of inboard shoulder main groove (mm) | 14.4 | 14.4 | 14.4 | 14.4 | 14.4 | 14.4 | 14.4 | 14.4 | 14.4 |
| Groove width w1d of outboard shoulder main groove (mm) | 5 | 6 | 2.9 | 2.9 | 2.9 | 2.9 | 2.9 | 2.9 | 2.9 |
| Area Sb ($cm^2$) | 131 | 132 | 129 | 129 | 129 | 129 | 129 | 129 | 129 |
| Area Sa ($cm^2$) | 182 | 182 | 182 | 182 | 182 | 182 | 182 | 182 | 182 |
| Land ratio Sb/Sa (%) | 72 | 73 | 71 | 71 | 71 | 71 | 71 | 71 | 71 |
| Center sipe | Presence | Presence | Absence | Presence | Presence | Presence | Presence | Presence | Presence |
| Pitch length P1 of center sipes (mm) | 60 | 60 | — | 39 | 45 | 75 | 81 | 60 | 60 |
| Pitch length P2 of inboard middle lateral grooves (mm) | 30 | 30 | — | 30 | 30 | 30 | 30 | 30 | 30 |
| Ratio P1/P2 (%) | 200 | 200 | — | 100 | 150 | 250 | 270 | 200 | 200 |
| Angle α3b of inboard middle sipe (degree) | 130-145 | 130-145 | 130-145 | 130-145 | 130-145 | 130-145 | 130-145 | 100-120 | 160 |
| Noise performance (Index) | 105 | 103 | 110 | 110 | 109 | 109 | 108 | 104 | 110 |
| Drainage performance (Index) | 99 | 100 | 98 | 98 | 98 | 98 | 98 | 96 | 96 |
| Steering stability (Index) | 105 | 103 | 100 | 110 | 112 | 113 | 105 | 108 | 106 |

From the test results, it was confirmed that Example tires in accordance with the present invention can be effectively improved the steering stability and noise performance while maintaining the drainage performance.

The invention claimed is:

1. A pneumatic tire having a designated installing direction to a vehicle, comprising a tread portion having an inboard tread edge and an outboard tread edge,
the tread portion being provided with: a pair of circumferentially extending inboard and outboard center main grooves disposed both sides of a tire equator to define a center portion therebetween; a pair of circumferentially extending inboard and outboard shoulder main grooves disposed axially outside of the inboard and outboard center main grooves; a pair of middle portions which include an inboard middle portion defined between the inboard center main groove and the inboard shoulder main groove, and an outboard middle portion defined between the outboard center main groove and the outboard shoulder main groove; and a pair of shoulder portions which include an inboard shoulder portion defined the axially outside of the inboard shoulder main groove, and an outboard shoulder portion defined the axially outside of the outboard shoulder main groove, wherein each of the inboard center main groove, the outboard center main groove and the inboard shoulder main groove has a groove width in a range of from 10 to 20 mm, the outboard shoulder main groove has a groove width in a range of from 2 to 5 mm, wherein the outboard shoulder portion is provided with a plurality of outboard shoulder lateral grooves each of which extends axially inwardly at least from the outboard tread edge and terminates without reaching the outboard shoulder main groove, the outboard middle portion is provided with a plurality of outboard middle lateral grooves, each of which outboard middle lateral grooves extends from the outboard shoulder main groove beyond a center in width direction of the outboard middle portion without reaching the outboard center main groove, and each of which outboard middle lateral grooves has a depth that gradually increases toward the outboard shoulder main groove, the inboard middle portion is provided with a plurality of inboard middle sipes each of which extends from the inboard shoulder main groove beyond a center in width direction of the inboard middle portion without reaching the inboard center main groove, and the inboard middle portion is further provided with a plurality of inboard middle lateral grooves each of which extends axially outwardly from the inboard center main groove without extending beyond a center in a width direction of the inboard middle portion, the inboard shoulder portion is provided with a plurality of inboard shoulder lateral grooves each of which connects between the inboard tread edge and the inboard shoulder main groove, and (i) a maximum depth of the inboard middle lateral grooves is smaller than a maximum depth of the outboard middle lateral grooves and a maximum depth of the inboard shoulder lateral grooves and (ii) a maximum depth of the outboard shoulder lateral grooves is smaller than the maximum depth of the outboard middle lateral grooves.

2. The tire according to claim 1, wherein the tread portion has a land ratio in a range of from 69% to 73%.

3. The tire according to claim 1 or 2, wherein the inboard middle ripe is inclined at an angle of from 120 to 155 degrees with respect to a circumferential direction of the tire.

4. The tire according to claim 1, wherein the inboard middle lateral grooves and the inboard middle sipes are alternately arranged in a circumferential direction of the tire.

5. The tire according to claim 1, wherein
the center portion is provided with a plurality of center sipes which extend from the inboard center main groove or the outboard center main groove,
center sipes have axially inner ends without reaching the tire equator, and
a circumferential pitch between adjacent center sipes is larger than that of the inboard middle lateral grooves.

6. The tire according to claim 1, wherein
the inboard shoulder lateral groove includes a wide portion extending from the inboard tread edge toward the inboard shoulder main groove; and a narrow portion having a groove width smaller than that of the wide portion and connecting between the wide portion and the inboard shoulder main groove.

7. The tire according to claim 6, wherein the narrow portion is provided with a tie-bar which has a protruded groove bottom so as to have a groove depth smaller than that of the wide portion.

8. The tire according to claim 1, wherein
the inboard shoulder portion is formed as a block row having a plurality of arranged inboard shoulder blocks in a circumferential direction of the tire, and
each inboard shoulder block has a substantially rectangular shape.

9. The tire according to claim 8, wherein the inboard shoulder block has a circumferential length and a width which are of from 15% to 20% of a tread width.

10. The tire according to claim 1, wherein
the outboard shoulder portion is provided with an outboard shoulder sub groove which continuously extends in a circumferential direction of the tire, and
the outboard shoulder sub groove has a groove width smaller than that of the outboard shoulder main groove.

11. The tire according to claim 10, wherein
each outboard shoulder lateral groove has an axially inner end, and
the outboard shoulder sub groove extends in a circumferential direction of the tire, so as to connect said each inner end of outboard shoulder lateral grooves.

12. The tire according to claim 1, wherein each of the inboard middle lateral grooves has a depth gradually increasing toward the inboard center main groove.

13. The tire according to claim 12, wherein each of the inboard middle lateral grooves has an axially inner end and an axially outer end, and the depth of the inboard middle lateral groove increases from the outer end to the inner end continuously.

14. The tire according to claim 13, wherein the maximum depth of the outboard middle lateral grooves is greater than the maximum depth of the inboard shoulder lateral grooves.

* * * * *